United States Patent [19]
Pavoni et al.

[11] Patent Number: 5,906,584
[45] Date of Patent: May 25, 1999

[54] DEVICE FOR THE INVASIVE THERMOMETRICAL MEASUREMENT AND FOR THE INTRODUCTION OF A MEDICAMENT FOR SURFACE AND DEEP HYPERTHERMIA TREATMENTS

[75] Inventors: Pierfrancesco Pavoni, 13, Avenue des Papalins, 9800 Montecarlo, Monaco; Guglielmo Marsiglia, Montespertoli; Gioacchino Possenti, Rome, both of Italy

[73] Assignee: Pierfrancesco Pavoni, Monaco; by said Guglielmo Marsiglia

[21] Appl. No.: 08/776,336

[22] PCT Filed: Jul. 26, 1995

[86] PCT No.: PCT/IT95/00131

§ 371 Date: May 21, 1997

§ 102(e) Date: May 21, 1997

[87] PCT Pub. No.: WO96/03627

PCT Pub. Date: Feb. 8, 1996

[30] Foreign Application Priority Data

Jul. 27, 1994 [IT] Italy ................................ RM94A0499

[51] Int. Cl.$^6$ ............................................. A61B 5/00
[52] U.S. Cl. ........................... 600/549; 600/412; 604/164
[58] Field of Search ..................... 600/549, 372, 600/373, 585, 412, 420, 434; 604/164, 264

[56] References Cited

U.S. PATENT DOCUMENTS

| | | | |
|---|---|---|---|
| 4,176,660 | 12/1979 | Mylrea et al. | 600/484 |
| 4,475,555 | 10/1984 | Linder | 600/483 |
| 4,669,475 | 6/1987 | Turner . | |
| 4,813,429 | 3/1989 | Eshel et al. | 600/549 |
| 4,841,981 | 6/1989 | Tanabe et al. | 600/549 |
| 4,899,759 | 2/1990 | Pederson et al. | 600/506 |
| 5,009,234 | 4/1991 | Alt | 600/549 |
| 5,108,364 | 4/1992 | Takezawa et al. | 600/549 |
| 5,176,649 | 1/1993 | Wakabayashi | 604/164 |
| 5,207,228 | 5/1993 | Roelandt et al. | 600/549 |
| 5,403,311 | 4/1995 | Abele et al. | 606/49 |
| 5,425,363 | 6/1995 | Wang | 600/375 |
| 5,437,637 | 8/1995 | Lieber et al. | 600/549 |
| 5,474,534 | 12/1995 | Schlitt | 604/164 |
| 5,500,012 | 3/1996 | Brucker et al. | 607/122 |
| 5,596,995 | 1/1997 | Sherman et al. | 600/549 |
| 5,599,346 | 2/1997 | Edwards et al. | 606/41 |

OTHER PUBLICATIONS

International Journal of Hyperthermia, vol. 2, No. 1, Jan. 1986–Mar. 1986, pp. 1–19.

P. Carnochan E.A., Journal of Medical Engineering & Technology, "The Practical Use of Thermocouples for Temperature Measurement in Clinical Hyperthermia", p. 4 paragraph 2–p. 5 paragraph 2 and p. 11.

Journal of Medical Engineering & Technology, 1986, vol. 2, No. 1. pp. 1–19, "The practical use of thermocouples for temperature measurement in clinical hyperthermia" by Carnochan et al.

Inter'l. Journal of Hyperthermia, vol. 2, No. 1, Jan.–Mar. 1986, pp. 1–9, "The practical use of thermocouples for temperature measurement in clinical hyperthermia" by Carnochan et al.

*Primary Examiner*—Richard J. Apley
*Assistant Examiner*—Justine R. Yu
*Attorney, Agent, or Firm*—Samuels, Gauthier & Stevens

[57] ABSTRACT

A device for invasive temperature measurements during surface and deep hyperthermia treatments. The device includes a needle-pin element and a catheter of a biocompatible material semi-rigid sheath surrounding the needle-pin element. The needle-pin element and the sheath are coupled such that the needle-pin element can be drawn out. At least one thermocouple is provided on an outer circumference of the semi-rigid sheath of the catheter. The thermocouple has an end to affect the temperature reading and is provided close to a surface of the sheath which is in contact with tissue of a human body. Positioning means are provided at the bottom of the catheter to position the catheter adjacent to a human body and for maintaining the catheter in position.

13 Claims, 3 Drawing Sheets

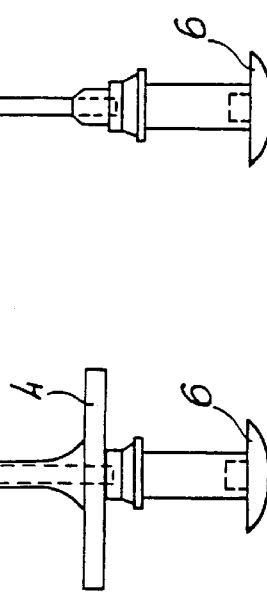
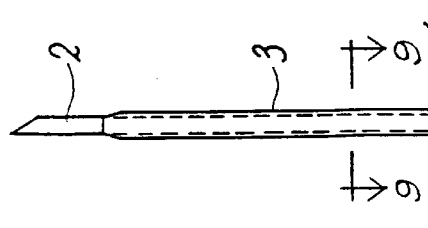
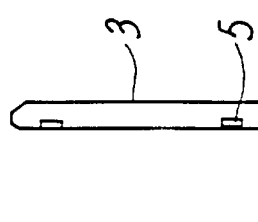

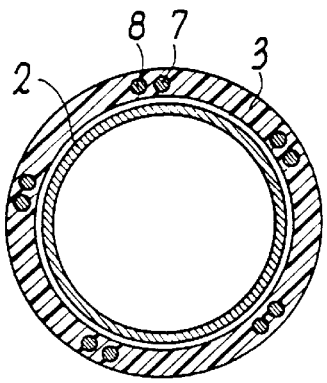
FIG. 9
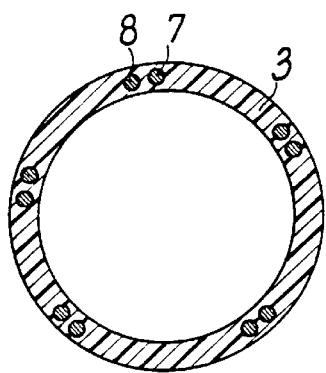
FIG. 8
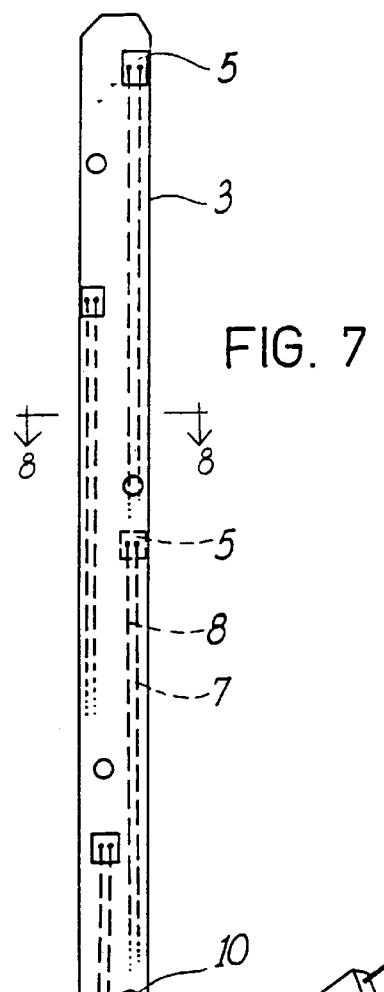
FIG. 7
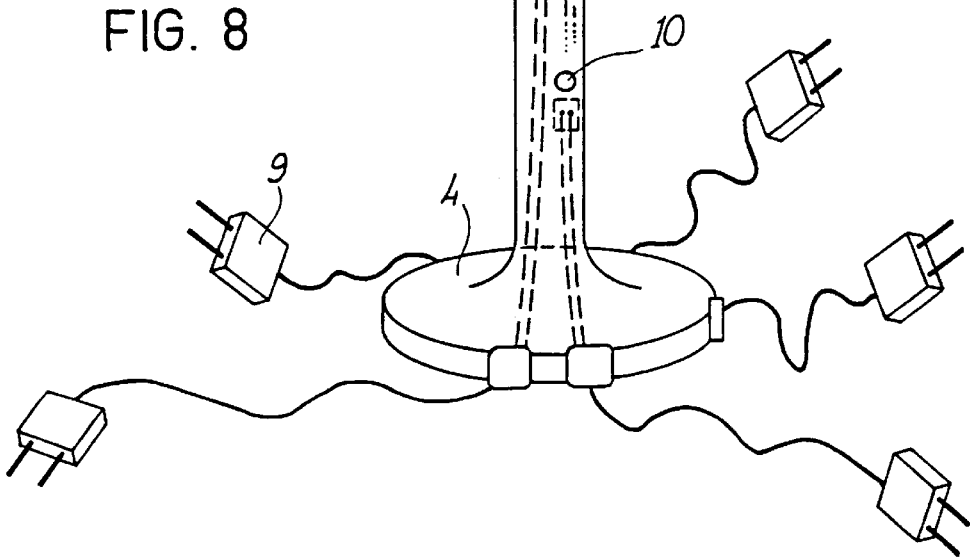

DEVICE FOR THE INVASIVE THERMOMETRICAL MEASUREMENT AND FOR THE INTRODUCTION OF A MEDICAMENT FOR SURFACE AND DEEP HYPERTHERMIA TREATMENTS

BACKGROUND OF THE INVENTION

1. Field of the Invention

The present invention relates to a device for the invasive thermometrical measurement and the introduction of a medicament for surface and deep hyperthermia treatments.

More specifically, the invention relates to a device which allows one to obtain with the maximum precision, the temperature reached employing the hyperthermia techniques in the zone to be treated, in order to optimize the therapeutic effect and if desired to introduce medicaments within the tissue.

2. Description of Prior Art

It is well known that hyperthermia is a therapy-active technology employed in the last ten years in the treatment of the cancer.

During the application of the hyperthermia therapy, radiofrequency and/or microwave apparatuses deposit electromagnetic waves within the organism thus producing heat within the organism, and it is necessary to take a measurement of the temperature within the treated zone in order to obtain the maximum result.

In order to obtain the maximum effect on the tumoral cells the temperature within the tumor reaches a temperature of approximately 42.5°–43° C., with a margin of error of +/−0.1° C.

It clearly follows that to obtain good results for the therapy, the temperature measurement systems must be able to operate with some precision.

After many years of experimentation, although the technology to deposit heat in depth has been improved, the invasive thermometric systems presently available have not reached a technological level similar to that of the apparatuses for the application of the hyperthermia, which still have remarkable drawbacks and contraindications.

In fact, the thermometric systems presently available are made up of constatan copper thermocouples and/or optical fiber introduced within the tumor by the introduction of needles-cannulae width 14–18 mm (+/−1.5 mm) and length 3–7.5 cm. The needles-cannulae are then drawn out leaving the wire bearing the thermocouple within the tissue.

With this technology, for each needle-cannula an average of one or two thermocouples and/or optical fibers are introduced. For each therapy treatment it is necessary to take 8–15 temperature reading points and therefore, it is necessary to employ from 4 to 15 needles.

This operation must be repeated for each hyperthermia treatment, for the complete cycle (5–10 treatments). Obviously it creates many inconveniences both for the patients, who must be pierced each time with needles of relatively large sizes, and for the operators who have practical and technical problems in correctly positioning and maintaining the thermocouple in the reading point.

In fact, for example, when drawing out the needle, very often the position of the thermocouple changes within the tissue thus having a negative effect on the temperature efficiency.

Although it facilitates the keeping of the position of the thermocouple within the tumoral zone, the presence of the needle within the organism is not allowed since it causes very strong pains for the patient both in case of muscle twitch and for the overheating of the needle (70°–80° C.) subjected to radiofrequency, RF.

Summarizing, the drawbacks of the present invasive thermometrical measurement systems can be individuated in a high needle/thermocouple number for each treatment, a needle cross-section that causes strong pains to the patients, a lack of precision of the positioning and maintaining the thermocouple at the correct reading point, the impossibility of maintaining the needle within the organism due to the overheating due to the radiofrequency, a scarce utilization practicality, a difficult possibility of use, and an inconvenience for the use in hyperthermia therapy in the medical field.

During the years, temperature reading systems of the non invasive kind have been suggested employing the TAC, the magnetic resonance and the radiometry.

However, the invasive reading of the temperature is until now the most precise and correct way.

In "International Journal of Hyperthermia", Vol. 2 No. 1 Jan–March 1986, a device is described having many of the disadvantages listed above.

SUMMARY

In view of the above, the Applicants have realized and developed a device that can solve all the above mentioned problems, allowing one to take an invasive measurement of temperature, and eventually the introduction of a medicament, in an extremely precise, reliable and easy method without any inconvenience for the patients.

These and other results are obtained, according to the present invention, using needles/pins-catheters which have thermocouples incorporated therein and which allow one to take the temperature within the same structure and which have dimensions that almost completely avoid the discomforts of the presently used catheters for both the patient and for the technician.

It is therefore a specific object of the present invention to provide a device for the invasive temperature measurement for surface and deep hyperthermia treatments, comprising a needle pin element and a catheter made up of a biocompatible material semirigid sheath, conformed about said needle-pin element and coupled with the same in such a way that the needle-pin element can be drawn out, characterized in that at least a thermocouple is provided on the outer circumference of the semirigid sheath of said catheter, in known positions to the user, having the end realizing the reading point provided close to the sheath surface coming into contact with the tissues, and in that an application element is provided, at the bottom of said catheter, for the application of the same to the human body and for maintaining the catheter in its position. The needle-pin element is introduced within the tissue until the application element adheres on the skin. The at least one thermocouple is provided with a socket projecting from the application element, and the socket is coupled with mating socket provided in the hyperthermia apparatus.

It is therefore a specific object of the present invention to provide a device for the invasive temperature measurement for surface and deep hyperthermia treatments, comprising a needle-pin element, a catheter made up of a biocompatible material semirigid sheath conformed about said needle-pin element, and coupled with the same in such a way that the needle-pin element can be drawn out. At least one thermocouple is provided on the outer circumference of the semirigid sheath of the catheter in positions known to the user, and having the end realizing the reading point provided close to the sheath surface which comes into contact with the tissues. An application element for the catheter is provided with a hole to allow the drawing out of the needle-pin element.

Preferably, the end realizing the reading point of said at least one thermocouple projects from the sheath approximately a few hundredths of millimeters.

According to a preferred embodiment of the device of the invention, the sheath can be provided with holes for the introduction of a medicament, each one preferably placed on the end of at least one thermocouple, spaced from the same.

Further, according to the invention, it is provided with a plug element closing the posterior part of said catheter and supporting the needle when it is introduced within the same catheter, or can be drawn out from the catheter for the introduction of the medicament.

Preferably, according to the invention, the needle-pin element is made up of stainless steel.

Still according to the invention, the semirigid sheath of the catheter is made up of Teflon®.

Further, according to the invention, said thermocouples are applied to the semirigid sheath by pressure-heat melting or by any other suitable technology.

The number of thermocouples provided can vary preferably between 1 and 15.

According to a preferred embodiment of the device according to the invention, the application element of the catheter to the human body is comprised of a PVC cap-ring, eventually inclinable, having an adhesive surface contacting the skin, and welded to the semirigid sheath.

Further, the application element can be provided with a number of holes corresponding to the number of thermocouples, in order to allow their exit. The thermocouples being collected in a further transparent sheath, preferably made up of Teflon®.

The device according to the invention can be both reusable and disposable.

The needle-pin element will be preferably a length between 1 and 8 cm.

The solution proposed according to the present invention allows, as it is well evident, to obtain invasive thermometers having extremely reduced sizes, greatly facilitating the introduction within the tissues of the same and annulling almost completely the pains due to the use of the known needles.

Further, the steel core of the needle-pin element gives stiffness to the structure and allows its introduction within the human tissues at the required depth (from 1 to 8 cm).

The possibility of drawing out the needle-pin element facilitates the permanence of the semirigid Teflon sheath for hours within the human tissues, without creating discomfort to the patient.

The adhesive application element ensures the positioning of the thermocouples in the reading points necessary for all the duration of the therapy and even more.

Further, the different pressure-heat melt thermocouples allow the specific measurement of more than one temperature with the same thermometer for the duration of the therapy (1–2 hours).

The Teflon® sheath guarantees the shielding of the metals of the thermocouple, impeding the incandescent effect due to the exposition to the radiofrequency and/or microwaves.

The great number of reading points on the same thermometer allows the introduction of a fewer number of needles in the tumor, considerably reducing the discomfort for the patient and allowing the therapist a greater optimization of the treatment and thus a greater efficiency of the hyperthermia therapy.

BRIEF DESCRIPTION OF THE DRAWINGS

The present invention will be now described, for illustrative, but not limitative purposes, according to its preferred embodiments, with particular reference to the figures of the enclosed drawings, wherein:

FIG. 1 is a lateral view of the device according to the invention;

FIG. 2 is a lateral view of the needle-pin of the device according to the invention;

FIG. 3 shows an embodiment of the catheter of the device according to the invention;

FIG. 4 shows a second embodiment of the catheter of the device according to the invention;

FIG. 5 shows the particular of the posterior plug of the device according to the invention;

FIG. 7 shows in still greater detail the catheter of FIG. 3;

FIG. 8 is a sectional view of the device according to the invention taken along line 8—8 of FIG. 7; and FIG. 9 is a sectional view of the device according to the invention taken along line 9—9 of FIG. 1, with the needle-pin element in position.

DESCRIPTION OF PREFERRED EMBODIMENT

Figure 6:
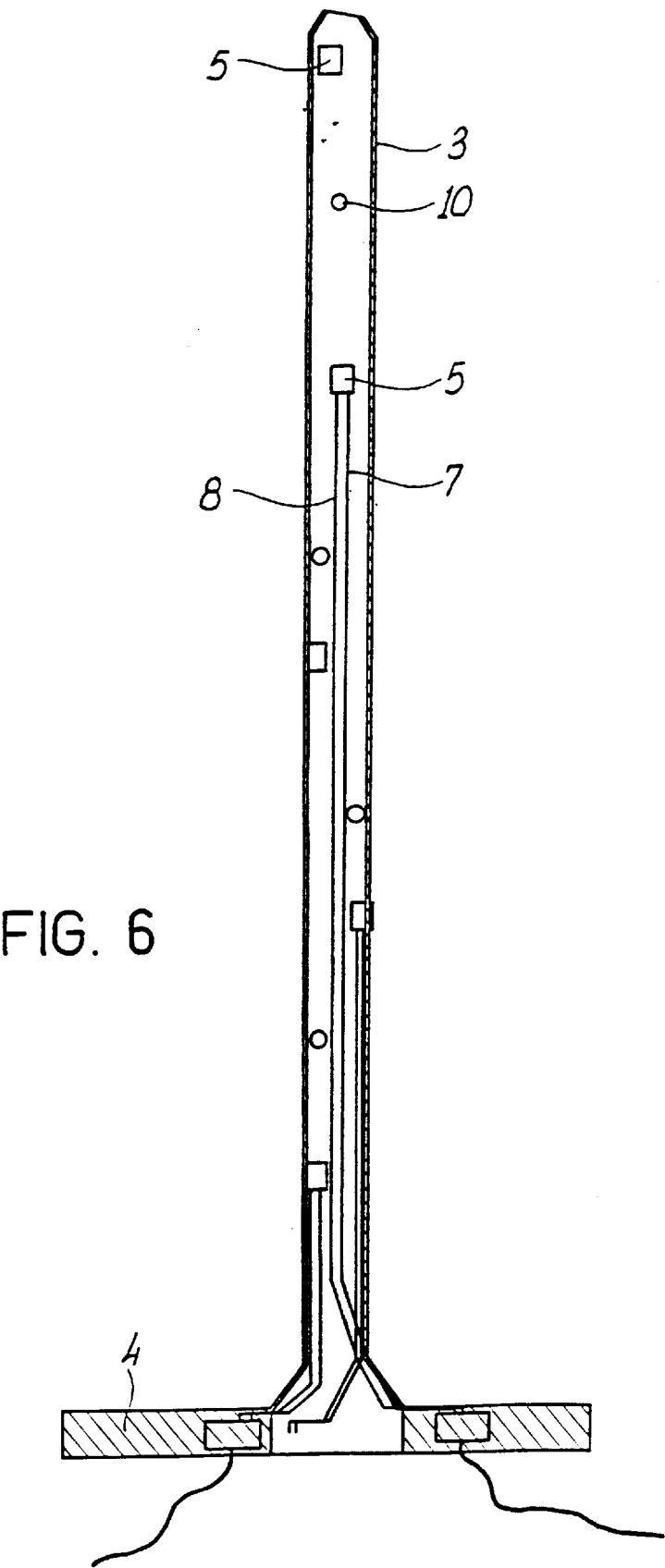
FIG. 6 shows a vertical section of the catheter of FIG. 3.

Preliminarily, it must be pointed out that the figures are not in scale.

Observing first FIG. 1, it is shown a device according to the invention for the invasive thermometrical measurement for surface and deep hyperthermia treatments according to the invention, generally indicated by the numeral 1.

The device comprises a needle 2 and a catheter 3, provided externally with respect to the needle 2, so that the tip of the needle projects from the catheter 3.

At the bottom, the catheter 3 is provided with an element 4 for the application of the same to the human body, realized in such a way to maintain the catheter 3 in its position.

The structure of the needle is shown in detail in FIG. 2.

As already said, in the catheter 3 it is provided a plurality of thermocouples 5, having the end slightly projecting with respect to the same catheter.

In FIG. 3 it is shown a solution having 5 thermocouples 5, while in FIG. 4 it is shown a solution providing 3 thermocouples 5.

Obviously, the number and the position of the thermocouples 5 varies in function of the specific use, thus it is necessary to bear in mind that the importance of the solution is in the fact that it can provide a great number of thermocouples 5 employing only one catheter, provided in reading positions absolutely known to the user.

In FIG. 5 it is particularly shown the plug 6 serving as closure of the catheter 3-needle 2 assembly, and when the needle has been drawn out, it serves to close the lower end of the catheter 3 (see FIG. 4).

The section view of FIG. 6 shows how the single thermocouples are provided within the catheter 3 and shows the wires 7 and 8 for the electric connection of the thermocouples 5 to the power supply and to the reading apparatus.

These features are also well evident from FIGS. 7, 8 and 9.

Particularly, from FIG. 7, it can be noted the male sockets 9 of the single thermocouples 5 connected to the wires of the thermocouples coming out from the catheter.

Instead, the sections of FIGS. 8 and 9 allow to particularly appreciate the structure of the catheter 3 with the wires 7 and 8 from the thermocouples buried in the same.

In FIGS. 6 and 7 are the holes 10 for the introduction of the medicament.

The device according to the present invention can be used as follows.

The needle 2 chosen is introduced (between 1 and 12 cm-between 1 and 15 reading points) within the tissue until the adhesive ring crown 4 adhering on the skin.

Then the stainless steel inner core is drawn out and it is closed by the flat micro plug 6 the center of the opened catheter.

Finally, all the male socket 9 of the thermocouples 5 projecting from the ring 4 are introduced within the female sockets provided in the hyperthermia apparatus (not shown).

In case it is desired to introduce a medicament, the plug 6 must be drawn out, introducing the medicament by the known technologies.

The present invention has been described for illustrative, but not limitative purposes according to its preferred embodiments, but it is to be understood that modifications and/or changes can be introduced by those skilled in the art without departing from the relevant scope as defined by the enclosed claims.

What is now claimed is:

1. A device for invasive temperature measurements for surface and deep hyperthermia treatments within tissue, said device comprises:

a catheter having a proximal end and a distal end, said catheter including a biocompatible semirigid sheath;

a needle-pin element removably coupled to said sheath, wherein said sheath surrounds said needle-pin element and said needle-pin element is used to introduce said catheter into the tissue;

at least one thermocouple located on an outer circumference of said semi-rigid sheath, said thermocouple having a temperature sensing point close to a surface of said sheath; and positioning means provided at the proximal end of said catheter to position said catheter adjacent to a human body and for maintaining said catheter in position, said needle-pin element being introduced within the tissue such that said positioning means adhere on the human body, and wherein said at least one thermocouple being provided with a socket projecting from said positioning means.

2. The device for the invasive temperature measurement for surface and deep hyperthermia treatments according to claim 1, wherein temperature sensing point of said at least one thermocouple projects from said sheath.

3. The device for the invasive temperature measurement for surface and deep hyperthermia treatments according to claim 1, wherein said sheath is provided with holes for introduction of a medicament.

4. The device for the invasive temperature measurement for surface and deep hyperthermia treatments according to claim 1, wherein a plug element closes said proximal end portion of said catheter and supports the needle-pin element within said catheter.

5. The device for the invasive temperature measurement for surface and deep hyperthermia treatments, according to claim 4, wherein said plug can be drawn out from the catheter.

6. The device for the invasive temperature measurement for surface and deep hyperthermia treatments according to claim 1, wherein said needle-pin element is made up of stainless steel.

7. The device for the invasive temperature measurement for surface and deep hyperthermia treatments according to claim 1, wherein said semirigid sheath of the catheter is made up of tetrafluoroethylene.

8. The device for the invasive temperature measurement for surface and deep hyperthermia treatments according to claim 1, wherein said at least one thermocouple is joined to the semirigid sheath by pressure-heat melting.

9. The device for the invasive temperature measurement for surface and deep hyperthermia treatments according to claim 1, wherein said device between 1 and 15 thermocouples.

10. The device for the invasive temperature measurement for surface and deep hyperthermia treatments according to claim 1, said positioning means including an application element adjacent to a bottom of the positioning means to maintain said catheter in place adjacent to human skin, said application element is made up of a polyvinyl chloride biocompatible cap-ring.

11. The device for the invasive temperature measurement for surface and deep hyperthermia treatments according to claim 1, wherein said positioning means has a number of openings corresponding to the number of thermocouples.

12. The device for the invasive temperature measurement for surface and deep hyperthermia treatments according to claim 1, wherein said sheath is transparent, biocompatible and is made up of tetrafluoroethylene.

13. The device for the invasive temperature measurement for surface and deep hyperthermia treatments according to claim 1, wherein the needle-pin element has a length between 1 and 8 cm.

* * * * *